United States Patent
Lin

(10) Patent No.: US 9,258,819 B2
(45) Date of Patent: Feb. 9, 2016

(54) FEMTOCELL AND METHOD OF ADJUSTING FREQUENCY

(71) Applicant: HON HAI PRECISION INDUSTRY CO., LTD., New Taipei (TW)

(72) Inventor: Yu-Hung Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 72 days.

(21) Appl. No.: 14/259,357

(22) Filed: Apr. 23, 2014

(65) Prior Publication Data

US 2015/0257149 A1 Sep. 10, 2015

(30) Foreign Application Priority Data

Mar. 10, 2014 (TW) .............................. 103108263 A

(51) Int. Cl.
*H04W 72/04* (2009.01)
*H04W 24/08* (2009.01)

(52) U.S. Cl.
CPC .......... *H04W 72/0453* (2013.01); *H04W 24/08* (2013.01)

(58) Field of Classification Search
CPC ......................... H04W 72/0453; H04W 24/08
See application file for complete search history.

(56) References Cited

U.S. PATENT DOCUMENTS

| 7,269,394 B2* | 9/2007 | Fei ....................... H04L 27/2657 455/114.2 |
| 7,672,277 B2* | 3/2010 | Qiao .................... H04B 1/7115 370/329 |
| 8,160,491 B2* | 4/2012 | Touboul ................ H04J 3/0644 370/252 |
| 8,306,527 B2* | 11/2012 | Carmon ............ H04W 56/0035 370/310 |
| 8,532,233 B2* | 9/2013 | Shimomura ........ H04J 13/0062 370/320 |
| 8,942,222 B2* | 1/2015 | Bachl .................. H04L 27/2657 370/344 |
| 2013/0343372 A1* | 12/2013 | Whinnett .......... H04W 56/0015 370/344 |

FOREIGN PATENT DOCUMENTS

CN 101860952 A 10/2010

* cited by examiner

*Primary Examiner* — Rasheed Gidado
(74) *Attorney, Agent, or Firm* — Novak Druce Connolly Bove + Quigg LLP

(57) ABSTRACT

A femtocell includes a frequency offset detecting module and a frequency correction module. The frequency offset detecting module calculates frequency offset and detects whether the frequency offset exceeds a default frequency offset. The frequency detecting offset module counts the time of the frequency offset exceeding the default frequency offset, and detects whether the counted number of times exceed a first default number. The frequency detecting module re-calculates frequency offset after an internal when the counted number of times does not exceed the first default number. The frequency correction module uses a last calculated frequency offsets to adjust the frequency of the femtocell, when the counted number of times exceed the first default number. A method of adjusting frequency of the femtocell is also provided.

10 Claims, 5 Drawing Sheets

FEMTOCELL AND METHOD OF ADJUSTING FREQUENCY

FIELD

Embodiments of the present disclosure generally relate to femtocell, and more particularly to a femtocell and method of adjusting frequency.

BACKGROUND

The frequency accuracy of a femtocell will change over time. A network time protocol (NTP) server can be used to adjust the frequency offset. The femtocell can obtain timing synchronization information from the NTP, and adjust a clock of the femtocell in response to the synchronization information. the accuracy of the synchronization information can be easily affected by network environment, which leads to the femtocell cannot adjust frequency accurately.

DETAILED DESCRIPTION

Figure 1:
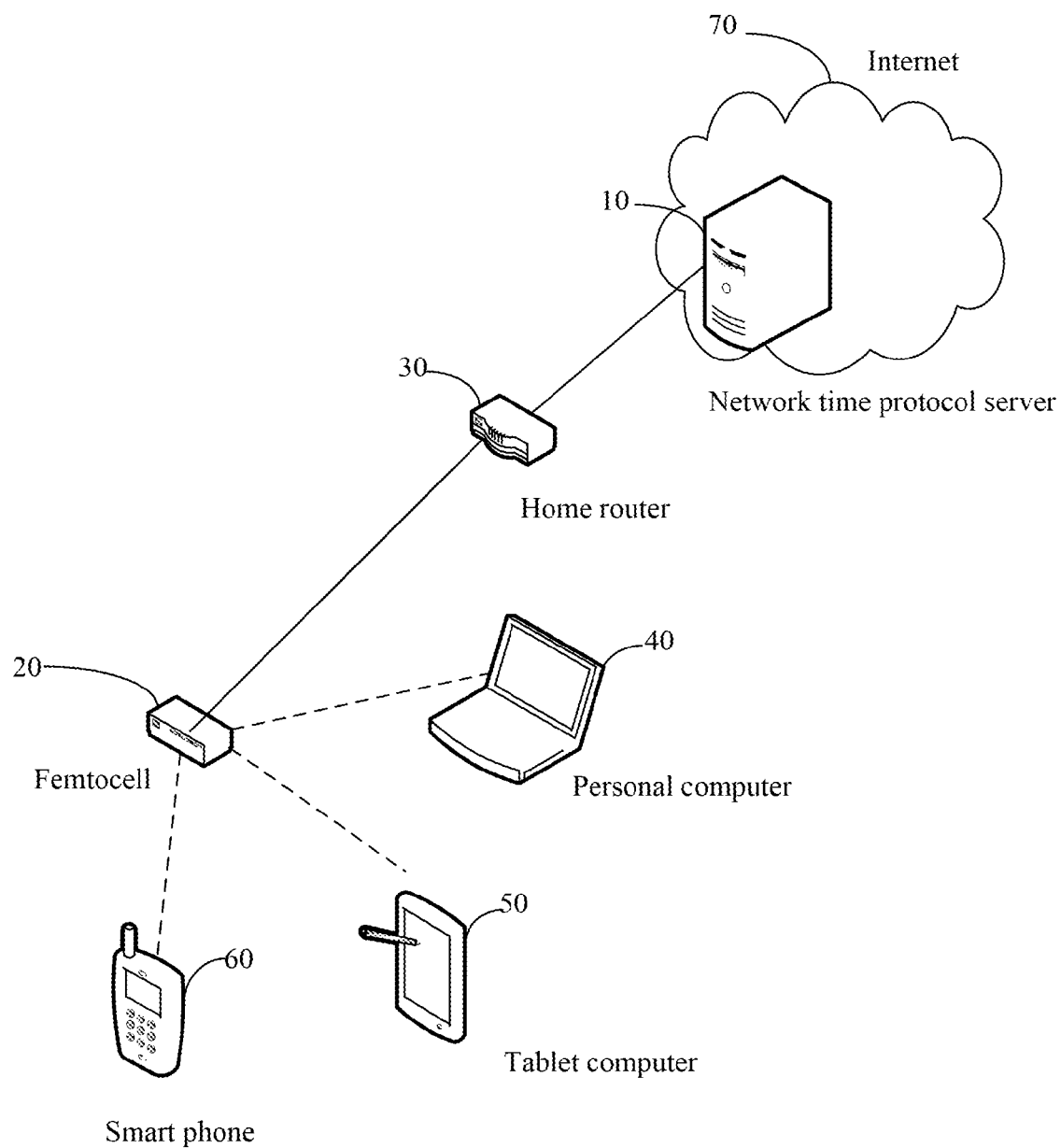
FIG. 1 is a diagram of an application environment of a femtocell in accordance with one embodiment of the present disclosure.

The embodiments are illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one."

In general, the word "unit" as used hereinafter, refers to logic embodied in hardware or firmware, or to a collection of software instructions, written in a programming language such as, for example, Java, C, or assembly. One or more software instructions in the units may be embedded in firmware such as in an erasable-programmable read-only memory (EPROM). It will be appreciated that units may comprise connected logic units, such as gates and flip-flops, and may comprise programmable units, such as programmable gate arrays or processors. The units described herein may be implemented as either software and/or hardware units and may be stored in any type of computer-readable medium or other computer storage device.

FIG. 1 is a diagram of an application environment of a femtocell 20 in accordance with one embodiment of the present disclosure. In the present embodiment, the femtocell 20 connects a home router 30. The home router 30 connects a network time protocol (NTP) server 10 via communication network 70, for example the Internet. The femtocell 20 wirelessly connects a personal computer 40, a tablet computer 50 and a smart phone 60.

In the present embodiment, the femtocell 20 calculates a frequency offset and detects whether the calculated frequency offset exceeds the default frequency offset. The femtocell 20 counts the time of the frequency offset exceeding the default frequency offset, and detects whether the counted number of times exceed a first default number.

The femtocell 20 waits an interval set by the user of the femtocell 20, and re-calculates the frequency offset when the counted number of times do not exceed the first default number. The femtocell 20 adjusts the frequency by using a last calculated frequency offset when the counted time exceeds the first default number.

Figure 2:
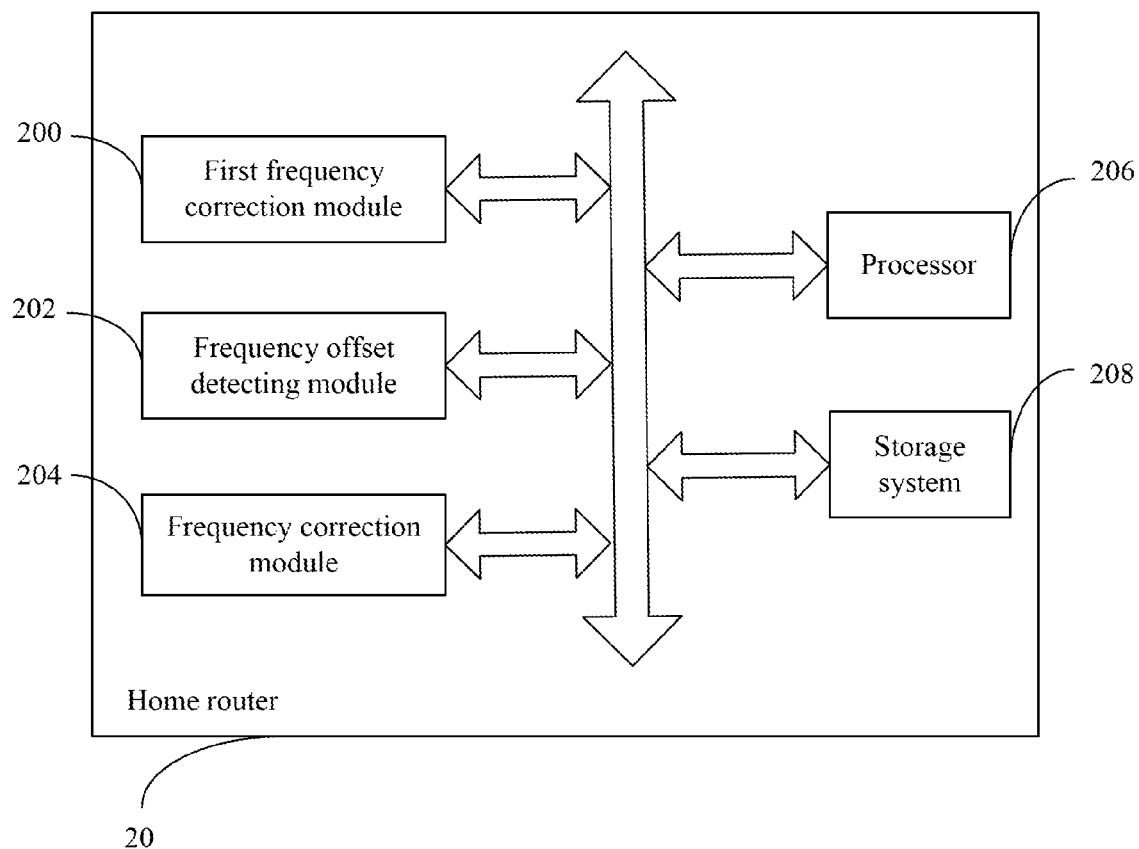
FIG. 2 is a block diagram of an example functional module of a femtocell.

FIG. 2 is a block diagram of an example functional modules of femtocell 20 in FIG. 1. In one embodiment of the present disclosure, the femtocell 20 includes a first frequency correction module 200, a frequency offset detecting module 202, a frequency correction module 204, a processor 206, and a storage system 208.

In one embodiment, the first frequency correction module 200 sends ten packets in one minute to the NTP server 10 and receives ten corresponding clock synchronization signals from the NTP server 10, and records ten network time delays of the ten packets, and calculates the average of the ten network time delays. The first frequency correction module 200 records ten corresponding standard times from the NTP server 10, and calculates ten time differences between the standard time and the time that the femtocell sends the packets.

The first frequency correction module 200 re-sends ten packets four times, re-records the network time delays, re-calculates the time differences, and calculates an average of the fifty network time delays and an average of the fifty time differences.

The first frequency correction module 200 detects whether the calculated average of the network time delays exceeds a default time delay, and adjusts the time of the femtocell by using the calculated average time differences when the calculated average of the network time delays does not exceed a default time delay.

The first frequency correction module 200 re-calculates the average of the network time delays and the average of the time differences, and calculates the frequency offset by using the calculated average time differences when the calculated average of the network time delays does not exceed the default time delay, and adjusts the frequency of the femtocell by using the calculated frequency offset.

In one embodiment, the frequency offset detecting module 202 calculates the frequency offset and detects whether the frequency offset exceeds a default frequency offset. The frequency offset detecting module 202 counts the time of the frequency offset exceeding the default frequency offset and detects whether the counted number of times exceed a first default number.

The frequency offset detecting module 202 waits an interval and re-calculates the frequency offset when the counted number of times does not exceed the first default number. The frequency correction module 204 adjusts the frequency by using a last calculated frequency offsets when the counted number of times exceed the first default number.

In another embodiment, the frequency offset detecting module 202 calculates the average of the network time delays and the average of the time differences at first. Then the frequency offset detecting module 202 detects whether the calculated average of the network time delays exceeds the default time delay. The frequency offset detecting module 202 counts the time of the calculated average of the network time delays exceeding the default time delay, and detects whether the counted number of times exceed a second default number at last.

The frequency offset detecting module 202 re-calculates the average of the network time delays and the average time differences when the counted number of times do not exceed the second default number firstly. The frequency offset detecting module 202 calculates an average of the calculated averages of the time differences when the counted number of times exceed the second default number secondly. The frequency offset detecting module 202 calculates the frequency offset by using the calculated average of the calculated averages thirdly.

The frequency offset detecting module 202 calculates the frequency offset by using the minimum time difference when the calculated average of the network time delays does not exceed the default time delay at last.

Figure 3:
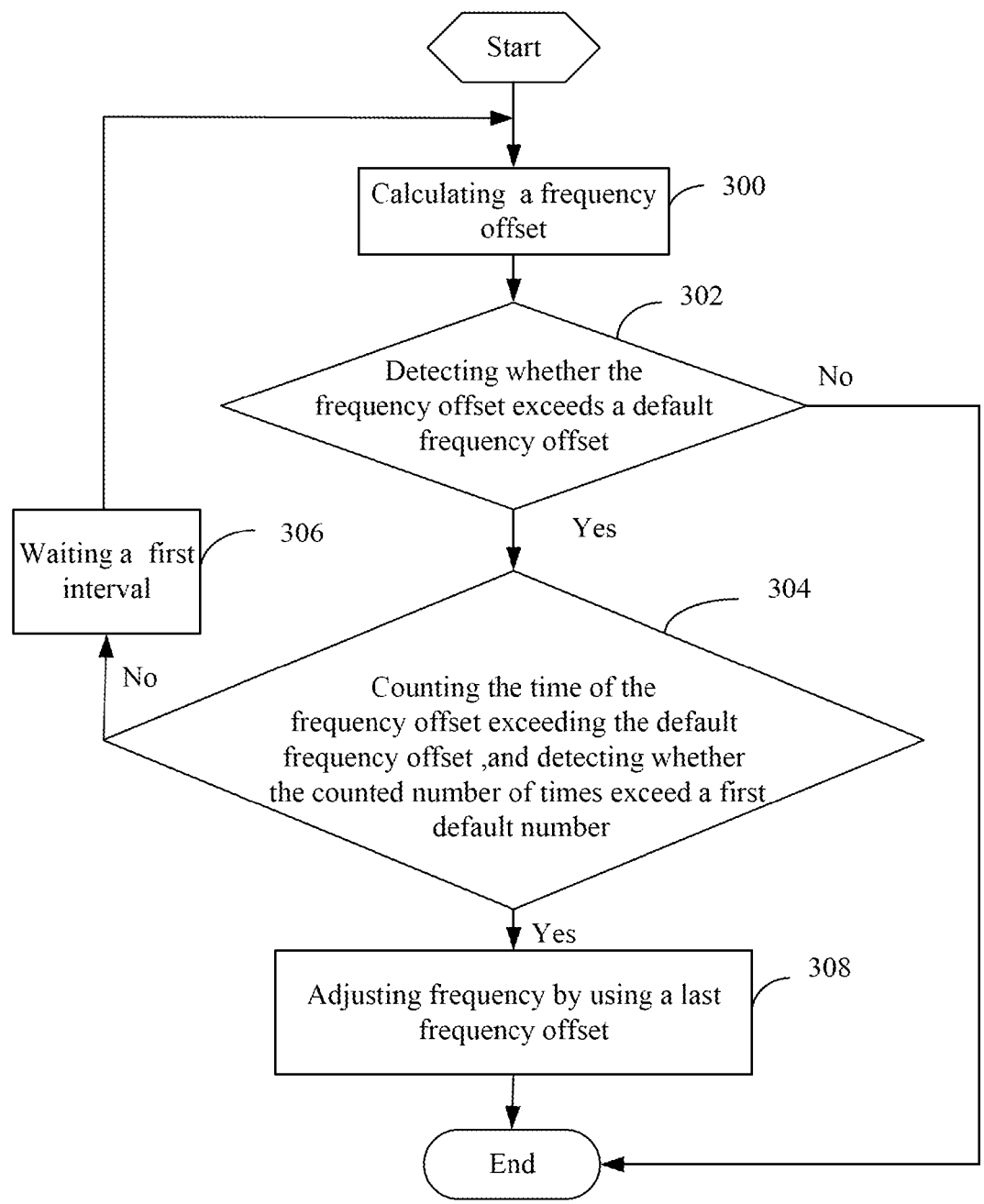
FIG. 3 is a flowchart of one embodiment of an adjusting frequency method in accordance with the present disclosure.

FIG. 3 is a flowchart of one embodiment of an example adjusting frequency method in accordance with the present disclosure, the method is utilized the femtocell 20 of FIG. 2. In the described embodiment, the method is carried out in the application environment illustrated in FIG. 1, and is executed by the first frequency correction module 200, the frequency offset detecting module 202, and the frequency correction module 204 of the femtocell 20.

In block 300, the frequency offset detecting module 202 calculates a frequency offset.

In block 302, the frequency offset detecting module 202 detects whether the calculated frequency offset exceeds the default frequency offset.

In the block 304, the frequency offset detecting module 202 counts the time of the frequency offset exceeding the default frequency offset, and detects whether the counted number of times exceed a first default number.

In block 306, the frequency offset detecting module 202 waits an interval set by the user of the femtocell 20, and re-calculates the frequency offset when the counted number of times does not exceed the first default number.

In block 308, the frequency correction module 204 adjusts the frequency by using a last calculated frequency offset when the counted number of times exceed the first default number.

Figure 4:
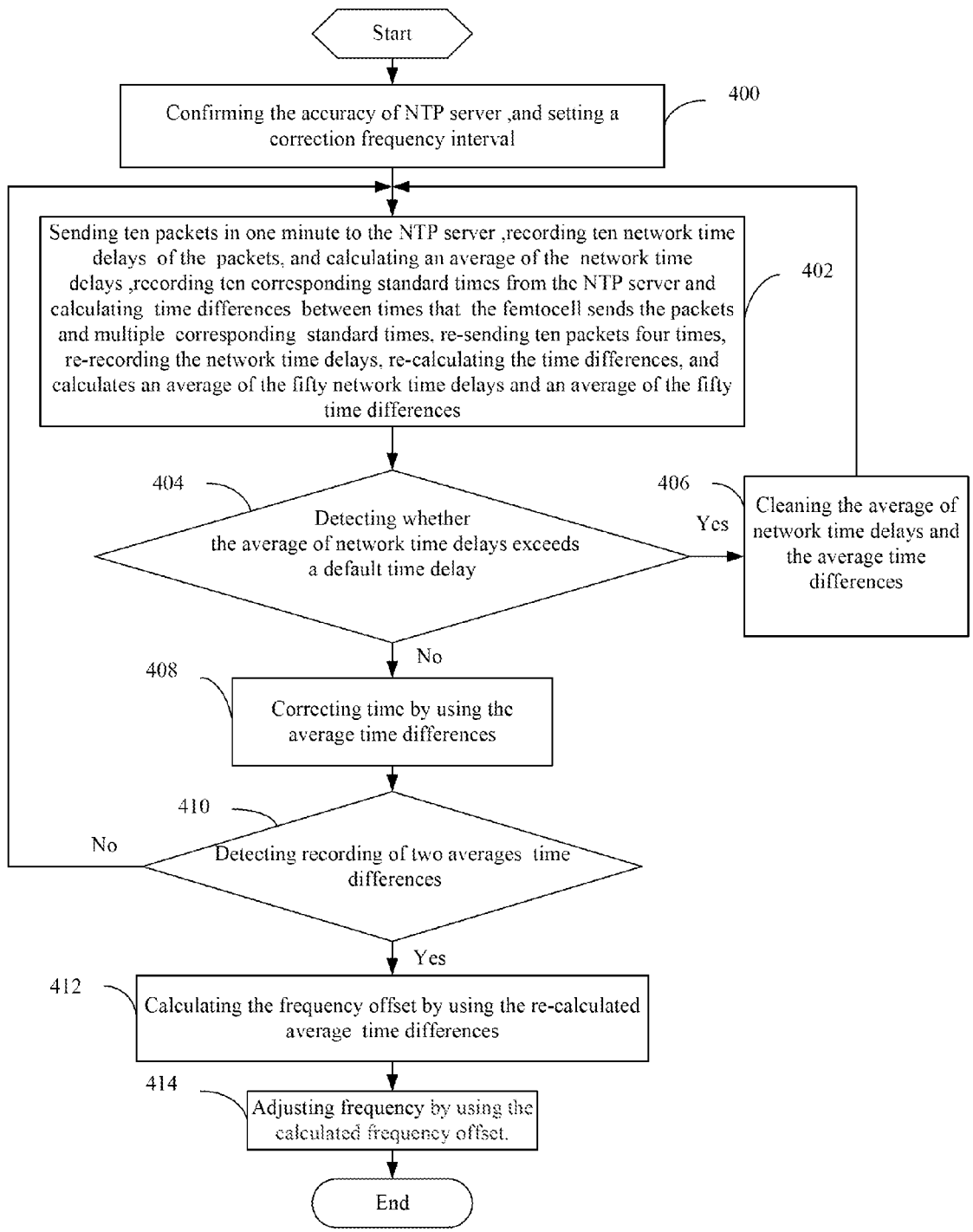
FIG. 4 is a flowchart of another example embodiment of a adjusting frequency method in accordance with the present disclosure.

FIG. 4 is a flowchart of another embodiment of a adjusting frequency method in accordance with the present disclosure. In the described embodiment, the method is carried out in the application environment illustrated in FIG. 1, and is executed by the first frequency correction module 200, the frequency offset detecting module 202, and the frequency correction module 204 of the femtocell 20.

In block 400, the first frequency correction module 200 confirms an accuracy of the NTP server 10, and sets a correction frequency interval.

In block 402, the first frequency correction module 200 sends ten packets in one minute to the NTP server 10 and receives ten corresponding clock synchronization signals from the NTP server 10, and records ten network time delays of the ten packets and calculates the average of the ten network time delays. The first frequency correction module 200 records ten corresponding standard time from the NTP server 10, and calculates ten time differences between the standard time and the time that the femtocell sends the packets.

The first frequency correction module 200 re-sends ten packets four times, re-records the network time delays, re-calculates the time differences, and calculates an average of the fifty network time delays and an average of the fifty time differences.

In block 404, the first frequency correction module 200 detects whether the calculated average of the network time delays exceeds a default time delay.

In block 406, the first frequency correction module 200 cleans the calculated average of the network time delays and the calculated average time differences when the calculated average of the network time delays exceeds a default time delay, and returns to block S402.

In block 408, the first frequency correction module 200 adjusts the time of femtocell by using the calculated average time differences when the calculated average of the network time delays does not exceed a default time delay.

In block 410, the first frequency correction module 200 detects recording of two average time differences. The first frequency correction module 200 returns to block S402 after adjusting the time of the femtocell.

In block S412, the first frequency correction module 200 calculates the frequency offset by using the re-calculated average time differences.

In block 414, the first frequency correction module 200 adjusts the frequency of the femtocell by using the calculated frequency offset.

Figure 5:
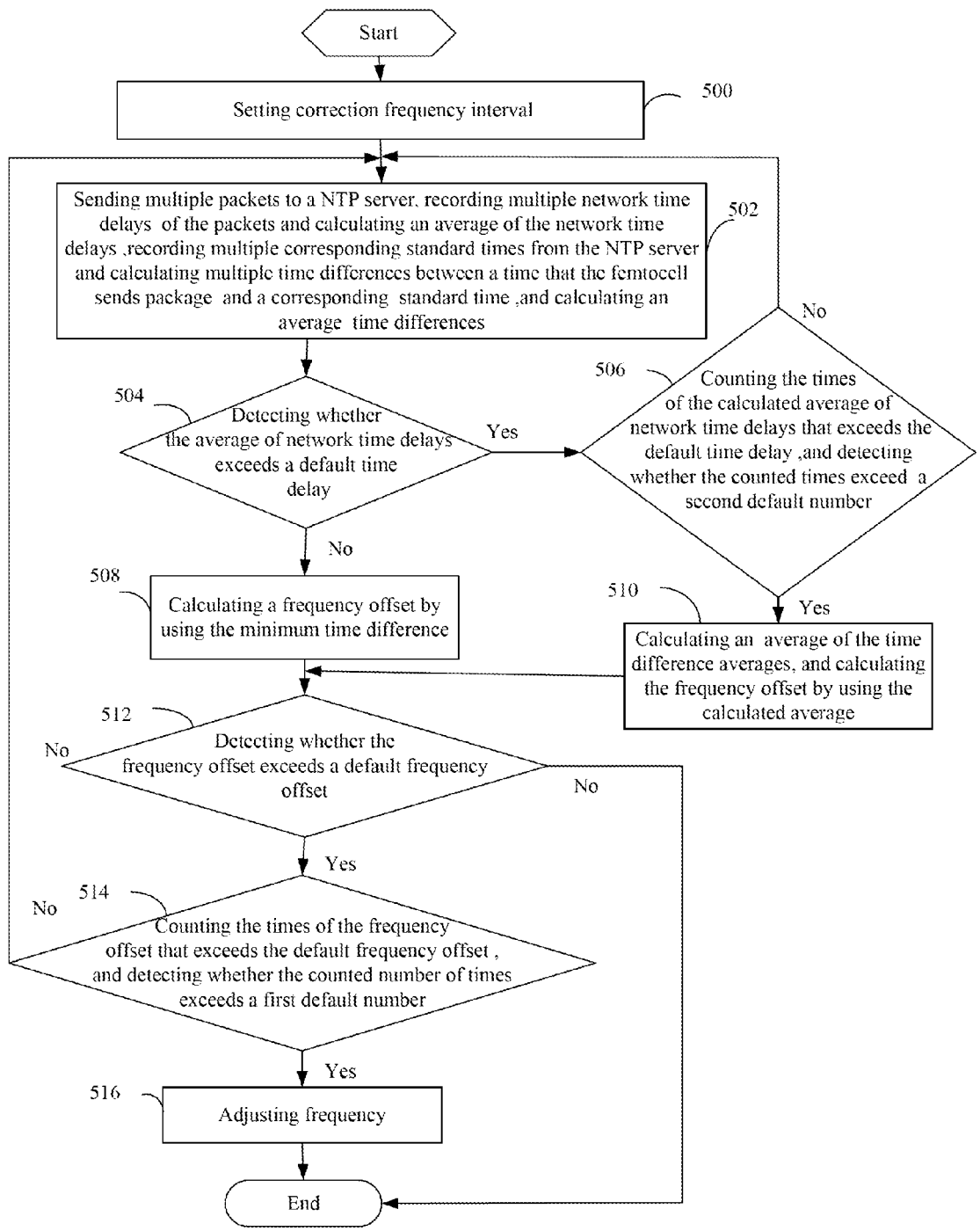
FIG. 5 is a flowchart of another example embodiment of a adjusting frequency method in accordance with the present disclosure.

FIG. 5 is a flowchart of another embodiment of an example adjusting frequency method in accordance with the present disclosure.

In block 500, the frequency offset detecting module 202 sets a correction frequency interval.

In block 502, the frequency offset detecting module 202 sends multiple packets to the NTP server 10 and receives multiple corresponding clock synchronization signals from the NTP server 10, and records multiple network time delays of the multiple packets, and calculates an average of the multiple network time delays. The frequency offset detecting module 202 records multiple corresponding standard time from the NTP server, and calculates multiple time differences between the standard time and the time that the femtocell sends the packet, and calculates an average time differences.

In block 504, the frequency of set detecting module 202 detects whether the calculated average of the network time delays exceeds the default time delay.

In block 506, the frequency offset detecting module 202 counts the time of the calculated average of the network time delays exceeding the default time delay, and detects whether the counted number of times exceed a second default number.

In block 508, the frequency offset detecting module 202 calculates the frequency offset by using the minimum time difference when the calculated average of the network time delays does not exceed the default time.

In block 510, the frequency offset detecting module 202 calculates an average of the time differences, and calculates a frequency offset by using the calculated average when the counted number of times exceed the second default number.

In block 512, the frequency offset detecting module 202 detects whether the frequency offset exceeds the default frequency offset.

In block 514, the frequency offset detecting module 202 counts the time of the frequency offset exceeding the default frequency offset, and detects whether the counted number of times exceed a first default number. The frequency offset detecting module 202 returns to block 502 when the counted number of times does not exceed the first default number.

In block 516, the frequency correction module 204 adjusts the frequency of the femtocell by using the calculated frequency offset.

Femtocell 20 and the method of adjusting frequency can adjust the frequency by using the auto-adaptable data obtained from the auto-adaptable frequency correction interval and improve the correction frequency accuracy.

While various embodiments and methods have been described above, it should be understood that they have been presented by way of example only and not by way of limitation. Thus the breadth and scope of the present disclosure should not be limited by the above-described embodiments, and should be at least commensurate with the following claims and their equivalents.

What is claimed is:

1. A femtocell, comprising:
at least one processor; and a non-transitory computer readable storage medium, storing instructions for controlling the processor to:
calculate a frequency offset of the femtocell;
detect whether the calculated frequency offset of the femtocell exceeds a default frequency offset;
count the times of the calculated frequency offset exceeding the default frequency offset;
detect whether the counted number of times exceed a first default number;
re-calculate the frequency offset when the counted number of times do not exceed the first default number;
adjust the frequency of the femtocell by using a last calculated frequency offsets when the counted number of times exceed the first default number.

2. The femtocell of claim 1 further comprising, communicating with a network time protocol (NTP) server; a first frequency correction module; wherein the first frequency correction module:
transmits multiple packets to the NTP server;
receives multiple corresponding clock synchronization signals, records multiple network time delays of the multiple packets;
calculates an average of the multiple network time delays;
records multiple corresponding standard time from the NTP server;
calculates multiple time differences between the standard time and the time that the femtocell sends the packets, and calculates an average of the multiple time differences;
detects whether the calculated average of the network time delays exceeds a default time delay; and
adjusts the time of femtocell by using the calculated average time differences when the calculated average of the network time delays does not exceed the default time delay.

3. The femtocell of claim 2, wherein the first frequency correction module further re-calculates the average time differences after adjusting the time of the femtocell, calculates the frequency offset of the femtocell by using the re-calculated average of time differences, and adjusts the frequency of the femtocell by using the calculated frequency offset.

4. The femtocell of claim 1, wherein the processor further re-calculates the average of the network time delays and the average time differences, and detects whether the re-calculated average of the network time delays exceeds the default time delay;
counts the time of the re-calculated average of the network time delays exceeding the default time delay;
detects whether the counted number of times exceed a second default number;
re-calculates the average of the network time delays and the average time differences when the counted number of times do not exceed a second default number; and
calculates an average of the calculated averages of the time differences when the counted number of times exceed the second default number, and calculates the frequency offset of the femtocell by using the calculated average of the averages.

5. The femtocell of claim 4, wherein the processor further calculates the frequency offset by using the minimum time difference of the time differences when the calculated average of the network time delays does not exceed the default network time delay.

6. A method of adjusting frequency of a femtocell, comprising:
calculating, by the femtocell, a frequency offset of the femtocell;
detecting, by the femtocell, whether the calculated frequency offset of the femtocell exceeds a default frequency offset;
counting, by the femtocell, times of the calculated frequency offset that exceeds the default frequency offset;
detecting, by the femtocell, whether the counted number of times exceed a first default number;
re-calculating, by the femtocell, the frequency offset of the femtocell when the counted number of times do not exceed the first default number; and
adjusting, by the femtocell, the frequency of the femtocell by using a last calculated frequency offsets when the counted number of times exceed the first default number.

7. The method of claim 6, further comprising:
sending, by the femtocell, multiple packets to a network time protocol (NTP) server and receiving multiple corresponding clock synchronization signals;
recording, by the femtocell, multiple network time delays of the multiple packets;
calculating, by the femtocell, the average of the multiple network time delays;
recording, by the femtocell, multiple corresponding standard time from the network time protocol server;
calculating, by the femtocell, multiple time differences between the standard time and the time that the femtocell sends the packet;
calculating, by the femtocell, an average of the time differences;
detecting, by the femtocell, whether the calculated average of the network time delays exceeds a default time delay; and
adjusting, by the femtocell, the time of the femtocell by using the calculated average time differences when the network time delays does not exceed a default time delay.

8. The method of claim 7, further comprising:
re-calculating, by the femtocell, the average time differences after adjusting the time of the femtocell;
calculating, by the femtocell, the frequency offset by using the re-calculated time difference; and
adjusting, by the femtocell, the frequency of the femtocell by using the calculated frequency offset.

9. The method of claim 6, further comprising:
re-calculating, by the femtocell, the average of the network time delays and the average of the time differences;
detecting, by the femtocell, whether the calculated average of the network time delays exceeds the default time delay;
counting, by the femtocell, a times of the calculated average of the network time delays that exceeds the default time delay;
detecting, by the femtocell, whether the counted number of times exceed a second default number;
re-calculating, by the femtocell, the average of the network time delays and the average time differences when the counted number of times do not exceed the first default number; and calculating, by the femtocell, an average of the calculated averages of the time differences when the counted number of times exceed a second default number, and calculating the frequency offset by using the calculated average of the averages.

10. The method of claim 9, further comprising:
calculating, by the femtocell, the frequency offset by using the minimum time difference when the calculated average of the network time delays does not exceed the default network time delay.

* * * * *